United States Patent [19]

Kodera et al.

[11] 4,220,736

[45] Sep. 2, 1980

[54] AGRICULTURAL COVERING FILM OR SHEET AND METHOD FOR THERMAL INSULATION FROM A BLEND OF AN OLEFIN RESIN AND AN ACETAL RESIN

[75] Inventors: Yoshiaki Kodera, Kusatsu; Kiyoyuki Watanabe, Jyoyo; Takayuki Kusu, Minoo, all of Japan

[73] Assignee: Sekisui Kagaku Kogyo Kabushiki Kaisha, Japan

[21] Appl. No.: 911,956

[22] Filed: Jun. 1, 1978

[51] Int. Cl.$^2$ .................. C08L 61/02; C08L 31/04; C08L 23/06

[52] U.S. Cl. .............................. 525/154; 47/29; 521/136

[58] Field of Search ............. 260/897 R, 897 B; 521/136, 143; 525/144

[56] References Cited

U.S. PATENT DOCUMENTS

| | | | |
|---|---|---|---|
| 3,250,823 | 5/1966 | Zeitlin | 260/857 |
| 3,306,877 | 2/1967 | Schott et al. | 260/67 |
| 3,476,832 | 11/1969 | Pritchard | 260/887 |
| 3,635,876 | 1/1972 | Chameroy | 260/37 |
| 3,980,734 | 9/1976 | Burg et al. | 260/897 |

FOREIGN PATENT DOCUMENTS

| | | | |
|---|---|---|---|
| 245696 | 7/1960 | Australia | 260/897 |
| 731239 | 3/1966 | Canada | 260/897 |

OTHER PUBLICATIONS

Lasman, "Foaming Agents for Polyolefins"—SPE Journal, Sep., 1962, pp. 1184–1193.

*Primary Examiner*—Carman J. Seccuro
*Attorney, Agent, or Firm*—Wenderoth, Lind & Ponack

[57] ABSTRACT

A resin composition in the form of a covering film or sheet comprising (A) 100 parts by weight of a thermoplastic olefinic resin and (B) about 1 to about 20 parts by weight of an acetal resin; and a method for maintaining an agricultural locus at temperatures suitable for the growth of plants, using above covering film or sheet.

4 Claims, No Drawings

AGRICULTURAL COVERING FILM OR SHEET AND METHOD FOR THERMAL INSULATION FROM A BLEND OF AN OLEFIN RESIN AND AN ACETAL RESIN

This invention relates to an agricultural covering film or sheet for maintaining a particular agricultural locus at temperatures suitable for the growth of plants, especially crops; and to a method for thermally insulating the agricultural locus using such a sheet or film.

Various synthetic resin films or sheets (including foamed ones) have been utilized heretofore as agricultural covering films or sheets, for example, in agricultural (the term is meant to include "horticultural") houses and tunnel houses, or in mulching. Examples are vinyl chloride resin films such as polyvinyl chloride films and olefinic resin films such as films of polyethylene or an ethylene/vinyl acetate copolymer. The vinyl chloride resin film or sheet most freqently used among them has the defect that the plasticizer contained in it collects dust on the surface of the film or sheet during use, and consequently, its light transmission is reduced to prevent the increase of the temperature within the house. Moreover, burning of the used vinyl chloride resin film or sheet causes a pollution by evolution of chlorine gas, hydrogen chloride gas, etc.

The thermoplastic olefinic resin film or sheet is superior to the vinyl chloride resin film or sheet in that it is chemically more stable, scarcely changes in light transmission during a long-term use, and does not generate noxious gases upon burning. However, it has the defect of having an inferior thermal insulating property to the vinyl chloride resin film or sheet.

The thermal insulating property of a convering film or sheet denotes its property of preventing a decrease in the inside temperature of a large-sized agricultural house, tunnel house or the like covered with the covering film or sheet, especially at night. The heat from the sunlight which has been absorbed in the soil within the house during the daytime is irradiated at night as radiant rays from the ground surface, thereby to maintain the inside of the house at a higher temperature than the temperature of the outer atmosphere. If the covering film or sheet has a high transmittance of radiant rays from the surface of the ground within the house, the radiant rays dissipate out of the house, and the ground temperature within the house decreases. Consequently, the inside temperature of the house cannot be maintained at a higher temperature than the outer atmosphere. Accordingly, the thermally insulating property of the covering film or sheet is better when it reflects or absorbs radiant rays to a higher degree from the ground surface at night.

Japanese Patent Publication No. 13853/72 discloses a covering film composed of an olefinic resin containing 1 to 10% by weight of silicon oxide, which has an improved thermally insulating property. However, when naturally occurring silicon oxide is used as the additive, even a small amount of it markedly impairs the transparency of the resulting olefinic resin film because it has a large particle size and contains great quantities of impurities. In order that the addition of 1% by weight or more of silicon oxide to an olefinic resin may not impair the transparency of the resulting film, it is necessary to use synthetic silicon oxide having a fine particle size of about several tens of millimicrons. However, fine silicon oxide is very bulky with an apparent density of 60 to 80 g/liter, and its mixing with the olefinic resin is difficult. It is more difficult to mix such silicon oxide in an amount of at least 12% by volume (when the amount is 1% by weight), and film formation cannot be performed with a good efficiency. Another disadvantage is that the high cost of synthetic silicon oxide adds to the cost of the resulting covering film or sheet.

The present inventors undertook investigations in order to provide an improved covering film or sheet of an olefinic thermoplastic resin which retains the aforesaid advantages of the olefinic resin film or sheet and eliminates the defect of its poor thermal insulation and especially can prevent the dissipation of radiant heat at night. These investigations led to the discovery that a resin composition in the form of a covering film or sheet comprising (A) a thermoplastic olefinic resin and (B) a certain minor amount of an acetal resin has the aforesaid advantages and prevents the dissipation of radiant heat, and is very useful as an agricultural covering film or sheet.

It is an object of this invention therefore to provide a resin composition in the form of a covering film or sheet suitable for use in agriculture and horticulture.

Another object of this invention is to provide a method for maintaining a particular agricultural locus at temperatures suitable for the growth of plants, especially crops, by utilizing the aforesaid covering film or sheet.

The above and other objects and advantages will become more apparent from the following description.

The resin composition in the form of a covering film or sheet in accordance with this invention comprises (A) 100 parts by weight of a thermoplastic olefinic resin and (B) about 1 to about 20 parts by weight of an acetal resin.

The thermoplastic olefinic resin (A) includes, for example, homopolymers or copolymers of α-olefins, and copolymers of α-olefins with other comonomers copolymerizable with the α-olefins. Specific examples are low-density polyethylene, medium-density polyethylene, high-density polyethylene, polypropylene, an ethylene/propylene copolymer, an ethylene/butylene copolymer, and an ethylene/vinyl acetate copolymer. Chlorinated polyethylene, chlorinated polypropylene, an ethylene/acrylic acid copolymer, an ethylene/methacrylic acid copolymer, and blends of these and aforesaid resins can also be used. Among these, ethylene resins, especially low-density polyethylene and an ethylene/vinyl acetate copolymer, are preferred because they can afford films or sheets having better transparency and suppleness than the other thermoplastic olefinic resins at lower costs. The ethylene/vinyl acetate copolymer is especially preferred because it has superior thermal insulation and does not easily permit the adhesion of water droplets. Conveniently, the copolymer has a vinyl acetate content of about 5 to about 20% by weight.

Suitable acetal resins (B) are polyoxymethylene polymers or copolymers having polyoxymethylene units of the formula $+HCHO+$. Examples are polyformaldehyde (termed an acetal homopolymer) which is regarded as a polymer of formaldehyde and an acetal copolymer resulting from the copolymerization of ethylene oxide or dioxane with polyoxymethylene. The copolymers may be block or graft copolymers which have a polyoxymethylene chain as the main chain or side chain of the molecules and the remainder of the molecule comprising ethylene, ethylene/vinyl acetate, ethylene/vinyl chloride, ethylene/vinyl chloride/vinyl acetate, ethylene/acrylic acid, ethylene/acrylate ester, acrylate ester, ethylene oxide, propylene oxide, propylene, butadiene or vinyl chloride.

Preferred acetal resins have a degree of polymerization of about 500 to about 3,500, especially about 2,000 to about 3,500. Especially preferred are those in which up to about 3% by weight, for example 1 to 3% by weight, of a comonomer such as ethylene oxide is copolymerized in the polyoxymethylene molecules. If the degree of polymerization of the acetal resin is below about 2,000, especially below about 500, its viscosity becomes low, and uniform mixing of it with the olefinic resin (A) is difficult. On the other hand, if the degree of polymerization is above 3,500, the melting point of the acetal resin (B) becomes too high. Hence, the resulting resin composition is difficult to shape, and the olefinic resin (A) is likely to decompose during film or sheet formation. Inclusion of a comonomer such as ethylene oxide is preferred because the acetal resin (B) becomes chemically and thermally stable. Especially preferred acetal resins are those having terminal carboxyl groups.

According to a preferred embodiment of the present invention, there is provided a resin composition in the form of a covering film or sheet which comprises (A) 100 parts by weight of a thermoplastic olefinic resin selected from the group consisting of ethylene resins, especially low-density polyethylene, and an ethylene/vinyl acetate copolymer, and mixtures of these, and (B) about 1 to about 20 parts by weight of a polyoxymethylene polymer or copolymer preferably containing up to about 3% by weight of a comonomer.

The resin composition of this invention in the form of a covering film or sheet useful for agricultural application can be produced by forming the composition composed of the resins (A) and (B) into a film or sheet. Known means for film or sheet formation can be used to shape the resin composition. For example, resins (A) and (B) are mixed and directly fed into an extruder where they are melt-kneaded. Or the resins (A) and (B) are melt-mixed and pelletized, and then fed into an extruder where the pellets are melt-kneaded. In either case, the molten mixture is then extruded into a film or sheet by such means as an inflation molding method or T-die molding method. A method is also available which comprises melt-kneading resin (A) with a heat-decomposable blowing agent such as an azo-type chemical blowing agent at a temperature at which the blowing agent does not decompose, extruding the mixture to form pellets, feeding the pellets and resin (B) into an extruder, and melt-extruding the mixture at a temperature at which the blowing agent decomposes, thereby to form a foamed film or sheet. Another method for preparing a foamed film or sheet comprises mixing resins (A) and (B), feeding the mixture into an extruder, continuously forcing a liquefied gas such as butane at a fixed rate into the extruder through an opening in it during the melt-extruding step, and further kneading and extruding the mixture.

The film or sheet so obtained may be oriented or heat-treated by stretching, heat-treatment, etc. For example, when the film or sheet is biaxially stretched by a tenter stretching method while being heated with hot air, its strength increases. The film has a uniform strength and is free from stress when heat-treated, or first stretched and then heat-treated.

The covering film or sheet of this invention may contain various additives. Examples of the additives are surface-active agents for imparting the property of flowing down the dew formed on the inside surface of an agricultural house, such as pentaerythritol fatty acid esters; ultraviolet absorbers for increasing weatherability, such as 2-(2'-hydroxy-5'-methylphenyl)benzotriazole; and antioxidants for inhibiting thermal degradation by outdoor exposure, such as butylated hydroxytoluene.

The amounts of these additives are optionally determined, but generally are about 0.2 to about 2.0% by weight for the surface-active agents; about 0.05 to about 0.5% by weight for the ultraviolet absorbers; and about 0.01 to about 0.1% by weight for the antioxidants, all based on the weight of the resin (A).

In the resin composition of this invention, the proportion of the acetal resin (B) based on the thermoplastic olefinic resin (A) is determined optionally according to a particular end use as an agricultural covering material. Usually, the amount of the acetal resin (B) is at least about 1 part by weight per 100 parts by weight of the thermoplastic olefinic resin. If it is less than about 1 part by weight, the thermal insulating effect of the covering material is in insufficient. When the proportion of the acetal resin (B) is increased, the thermal insulating property of the resulting composition increases, but the resulting covering material becomes hard and brittle and is susceptible to breakage (the strength is lost). Hence, for use as an outer covering of an agricultural house, the amount of the acetal resin (B) is preferably about 1 to about 20 parts by weight per 100 parts by weight of olefinic resin. For uses which require thermal insulation but do not strictly require strength and transparency, for example, in the case of a covering material for a tunnel house within an agricultural house, a thermally insulating covering material for additionally covering the inner surface of an agricultural house or a tunnel house only during night, or a mulching material or covering material for growing rice seedlings, the preferred amount of the acetal resin (B) is at least about 12 parts by weight.

According to another aspect of this invention, there is provided a method for maintaining an agricultural locus at temperatures suitable for the growth of plants, especially crops, which comprising covering the said locus with a covering film or sheet of a resin composition comprising (A) 100 parts by weight of a thermoplastic olefinic resin and (B) about 1 to about 20 parts by weight of an acetal resin.

The particular agricultural locus, as referred to in the present application, is a locus where plants are being grown or will be grown. It should be understood that this locus includes the one where the terrestrial portion of a plant does not appear but its bulbs, roots or seeds are present.

The following Examples illustrate the present invention.

EXAMPLE 1

A mixture of 100 parts by weight of low-density polyethylene (Yukalon YF-30, a trademark for a product of Mitsubishi Petrochemical Co. Ltd.; MI=1.0), 12 parts by weight of polyacetal (Duracon M-25-10, a trademark for a product of Polyplastics Co., Ltd.; MI=2.5) and 0.5 part by weight of a 1:1 mixture of pentaerythritol monostearate and pentaerythritol monobiphenate as a surface-active agent (in the form of a mixture with the low-density polyethylene) was fed into an extruder and kneaded at 200° to 220° C., and extruded from T-die to obtain a film having a thickness of 0.1 mm. The film was found to have much the same transparency, strength and suppleness as a film of the low-density polyethylene alone.

EXAMPLE 2

The procedure of Example 1 was repeated except that medium-density polyethylene (Showlex 5008, a trademark for a product of Showa Yuka Kabushiki Kaisha; MI=0.8) was used instead of the low-density polyethylene. A transparent film with a thickness of 0.1 mm was obtained.

EXAMPLE 3

The procedure of Example 1 was repeated except that an ethylene/vinyl acetate copolymer (Evaflex V-501, a trademark for a product of Mitsui Polychemical Co., Ltd.; a vinyl acetate content of 14.5% by weight and MI of 1.3) was used instead of the low-density polyethylene, and the amount of the polyacetal was changed to 7 parts by weight. A transparent film with a thickness of 0.1 mm was obtained.

EXAMPLE 4

The procedure of Example 1 was repeated except that polypropylene (Mitsubishi Noblene, a trademark for a product of Mitsubishi Petrochemical Co. Ltd.; MI=8.0) was used instead of the low-density polyethylene, and 0.2 part by weight of a light stabilizer (Tinuvin 120, a trademark for a product of Ciba-Geigy) was added together with the surface-active agent. A transparent film with a thickness of 0.1 mm was obtained.

Agricultural houses were built by using the films obtained in Examples 1 to 4 as covering materials. The air temperature and the temperature of the ground (measured at a position 5 cm below the ground surface) within each house were measured. The results are shown in Table 1.

For comparison, similar agricultural houses were built by using a 0.1 mm-thick polyethylene film (Comparative Example 1), an ethylene/vinyl acetate copolymer film (Comparative Example 2), and a polyvinyl chloride film (Comparative Example 3) which were conventional covering films, and the air temperatures and the ground temperatures within the houses were measured in the same way. The results are also shown in Table 1.

Table 1

| Run | Transmittance of infrared rays (%) | 1:00 a.m. Air temperature | 1:00 a.m. Ground temperature | 6:00 a.m. Air temperature | 6:00 a.m. Ground temperature |
|---|---|---|---|---|---|
| Example 1 | 9 | −2.9 | 4.8 | −3.0 | 4.2 |
| Example 2 | 9 | −2.9 | 4.8 | −2.9 | 4.2 |
| Example 3 | 5.5 | −2.7 | 5.0 | −2.7 | 4.3 |
| Example 4 | 8 | −2.9 | 4.9 | −2.8 | 4.2 |
| Comparative Example 1 | 80 | −3.8 | 4.1 | −4.0 | 3.0 |
| Comparative Example 2 | 35 | −3.0 | 4.8 | −3.0 | 4.2 |
| Comparative Example 3 | 5 | −2.8 | 5.2 | −2.8 | 4.4 |

The above temperatures were measured at Uji City, Kyoto, Japan in January 1976. At 6:00 a.m. on the day of measurement, the atmospheric temperature was −4.0° C. and the ground temperature outside the houses was −1.0° C.

The transmittance (%) of infrared rays is that of infrared rays having a wavelength of 9 to 11 microns. The mechanism of thermal insulation of the agricultural houses at night is that the covering film reflects and absorbs radiant rays from the soil within the house and thus prevents radiant rays from dissipating out of the house. The radiant rays from the ground surface have a wavelength in the range of 5 to 20 microns, and their radiant energy becomes maximum at a wavelength of 9 to 11 microns. Hence, the thermal insulation of the covering film is better when the transmittance of radiant rays within this wavelength region is lower.

The results in Table 1 show that when the covering material of this invention is used, the air temperature and ground temperature within the house are higher than in the case of using the conventional olefinic resin films (Comparative Examples 1 and 2). In particular, a composition of it with the low-density polyethylene film (Comparative Example 1) shows that the air temperature within the house covered by the present invention was 0.9°–1.3° C. higher between 1:00 a.m. and 6:00 a.m. This indicates the superior thermal insulation of the covering film or sheet of the present invention. When the temperature at dawn is higher even slightly, the temperature within the house during the daytime is far higher than the outer atmospheric temperature, and thus, the average air temperature in a given day increases greatly. Thus, the difference becomes great in the integrated temperature (the average temperature of one day multiplied by the number of days) in the course of growth of crops, and greatly affects the amount and time of harvest of crops.

EXAMPLE 5

The procedure of Example 3 was repeated except that the amount of the polyacetal was increased to 20 parts by weight. A film having a thickness of 0.1 mm was obtained. The film was somewhat cloudy, but was a covering material having superior thermal insulation for a tunnel house of crops which did not strictly require light transmission.

EXAMPLE 6

A mixture of 100 parts by weight of the same low-density polyethylene as used in Example 1 and 6 parts by weight of the same polyacetal as used in Example 1 was fed into an extruder, and melt-kneaded at 190° to 210° C. Liquid butane (13 parts by weight) was poured as a blowing agent into the mixture through an opening in the extruder and kneaded. The mixture was extruded through a T-die to make a foamed sheet having a thickness of 2 mm and an expansion factor of 30.

EXAMPLE 7

The procedure of Example 6 was repeated except that high-density polyethylene (Novatec ET-008, a trademark for a product of Mitsubishi Chemical Co., Ltd.; MI=0.8) was used instead of the low-density polyethylene, and the amount of the blowing agent was changed to 15 parts by weight. A foamed sheet having a thickness of 2 mm and an expansion factor of 30 was obtained.

EXAMPLE 8

The procedure of Example 6 was repeated except that polypropylene (the same one as used in Example 4) was used instead of the low-density polyethylene, and the amount of the blowing agent was changed to 15 parts by weight. Thus, a 2 mm-thick foamed sheet having an expansion factor of 30 was obtained.

The foamed sheets obtained in Examples 6 to 8 were used as covering materials for tunnel houses, and the air temperature within the houses at night was measured. The results are shown in Table 2. The foamed sheets were removed during the daytime, and placed in position in the evening to confirm the thermally insulating effect of the foamed sheets.

For comparison, the same test was performed using a conventional low-density polyethylene foamed sheet with a thickness of 2 mm and an explanation factor of 30 (Comparative Example 4).

Table 2

|  | Air temperature (°C.) within the tunnel house | |
|---|---|---|
|  | 1:00 a.m. | 6:00 a.m. |
| Foamed sheet of Example 6 | 0.4 | −1.1 |
| Foamed sheet of Example 7 | 0.4 | −1.0 |
| Foamed sheet of Example 8 | 0.5 | −1.0 |
| Foamed sheet of Comparative Example 4 | −0.7 | −2.7 |

The temperature measurement was made at Uji city, Kyoto, Japan in January 1976. At 6:00 a.m. on the day of measurement, the atmospheric temperature was −3.4° C.

It is seen from Table 2 that with the foamed sheets of this invention, the air temperature inside the house was 1.1°–1.6° C. higher than with the conventional foamed sheet between 1:00 a.m. and 6:00 a.m. This indicates the superior thermal insulating property of the foamed sheet prepared from the composition of this invention.

The films or sheets (including foamed sheets) prepared from the resin composition of this invention can be used with good thermal insulating properties as mulching materials in addition to covering materials for agricultural houses or tunnel houses.

The agricultural covering material in accordance with this invention is made by forming the composition of a thermoplastic olefinic resin and an acetal resin into films, and has superior thermal insulating properties to conventional olefinic resin films used heretofore as agricultural covering materials. The film or sheet of the invention has thermal insulating properties comparable to vinyl chloride resin films without substantially impairing the transparency and strength of the olefinic resin, and is free from the defects of the vinyl chloride resin films.

Since the acetal resin is an organic polymer, it can be easily mixed with the olefinic resin or vinyl chloride resin unlike the conventional silicon oxide additive. Thus, the films or sheets (including foamed ones) can be easily prepared by conventional molding apparatuses.

What we claim is:

1. A resin composition in the form of a covering film or sheet consisting essentially of (A) 100 parts by weight of a thermoplastic olefinic resin selected from the group consisting of polyethylene, an ethylene/vinyl acetate copolymer, and mixtures of these and (B) about 1 to about 20 parts by weight of an acetal resin having a degree of polymerization of about 500 to about 3,500 and selected from the group consisting of polyoxymethylene polymer and polyoxymethylene copolymer containing up to about 3% by weight of comonomer.

2. The composition according to claim 1 wherein the olefinic resin is low density polyethylene.

3. The composition according to claim 1 wherein the olefinic resin is an ethylene/vinyl acetate copolymer having a vinyl acetate content of about 5 to about 20%.

4. The covering sheet or film of claim 1 which is in the foamed state.

* * * * *